United States Patent [19]

Ozono

[11] Patent Number: 4,550,565
[45] Date of Patent: Nov. 5, 1985

[54] GAS TURBINE CONTROL SYSTEMS

[75] Inventor: Jiro Ozono, Yokohama, Japan

[73] Assignee: Tokyo Shibaura Denki Kabushiki Kaisha, Kawasaki, Japan

[21] Appl. No.: 571,068

[22] Filed: Jan. 16, 1984

[51] Int. Cl.[4] .......................... F02C 6/18; F02C 9/20
[52] U.S. Cl. ............................... 60/39.182; 60/39.27
[58] Field of Search .............. 60/39.03, 39.182, 39.27, 60/39.29

[56] References Cited

U.S. PATENT DOCUMENTS

| | | | |
|---|---|---|---|
| 3,973,391 | 8/1976 | Reed et al. | 60/39.182 |
| 4,028,884 | 6/1977 | Mantz et al. | 60/39.182 |
| 4,081,956 | 4/1978 | Baker et al. | 60/39.182 |
| 4,175,382 | 11/1979 | Pfenninger | 60/39.182 |

Primary Examiner—Louis J. Casaregola
Attorney, Agent, or Firm—Schwartz, Jeffery, Schwaab, Mack, Blumenthal & Evans

[57] ABSTRACT

In an electric power generating system comprising an air compressor having inlet variable stationary blades, a fuel burner supplied with compressed air from the compressor, a gas turbine driven by combustion gas from the fuel burner, a waste heat recovery boiler for generating steam, a steam turbine driven by the steam and an electric generator driven by the gas turbine, there is provided a control system including a detector for detecting actual load of the gas turbine, a first comparator for comparing detected actual load with a load instruction for producing a difference signal, a speed/load control circuit responsive to difference between the difference signal and a signal representing a number of revolutions of the gas turbine for controlling fuel supplied to the burner, a second comparator for comparing with each other the difference signal, a signal representing temperature of gas discharged from the gas turbine and a temperature set signal, and a control circuit inputted with the output of the second comparator for controlling degree of opening of the inlet variable stationary blade. In a modification the generator is driven by both the gas turbine and steam turbine.

5 Claims, 7 Drawing Figures

GAS TURBINE CONTROL SYSTEMS

BACKGROUND OF THE INVENTION

This invention relates to a gas turbine control system, and more particularly to a gas turbine control system suitable for use in a composite electric power generating plant to improve its load follow-up characteristic.

In recent steam electric power generating plants, as the cost of the fuel has increased, the request for improving the load follow-up characteristic including start and stop of the plants has become remarkable for the purpose of improving thermal efficiency and attaining middle load. As a solution of this problem a composite electric power generating plant comprising a combination of a gas turbine and a steam plant has been developed.

In a gas turbine utilized in such composite electric power generating plant, for the purpose of improving the overall thermal efficiency of the plant, it has been considered to increase the exhaust temperature of the gas turbine and the quantity of steam generated by a waste heat recovery boiler so as to increase the output of the steam turbine. For example, a system has been known in which the inlet stationary blades of a compressor installed before a gas turbine are made variable so as to decrease the quantity of air flowing into the gas turbine at a partial load thereby increasing the exhaust temperature of the gas turbine.

FIG. 1 is a block diagram showing a prior art gas turbine of a composite electric power generating plant of the type described above. FIG. 1 shows a prior art system of increasing the exhaust temperature of a gas turbine supplied with compressed air from a compressor provided with inlet variable stationary blades.

In FIG. 1, inlet variable stationary blades 2 are provided for the inlet 1 of an air compressor 3 so as to control the quantity of air flowing into the compressor. The air compressed by compressor 3 is sent to a burner 4 for burning fuel 6, the flow quantity thereof being adjusted with a fuel adjusting valve 5. High temperature gas formed as a result of combustion of the fuel is sent to a gas turbine 8 to drive an electric generator 10. Exhaust gas from the gas turbine 8 is sent to a waste heat recovery boiler 11 to heat water fed to the boiler 11 so as to generate steam which is sent to a steam turbine, not shown. The steam turbine is coupled to generator 10 or separate generator, not shown.

FIG. 2 is a block diagram showing a prior art gas turbine control system applicable to the gas turbine 8 shown in FIG. 1. The control system shown in FIG. 2 is constituted by a start control circuit 11, a speed/load control circuit 12, a temperature control circuit 13, and an inlet variable stationary blade control circuit 14. Fuel control signals from these control circuits 11, 12, and 13 are applied to a low value priority circuit 15 and their minimum value is sent to a fuel adjusting valve control circuit 16, the output signal thereof being sent to the fuel adjusting valve 5 to control its degree of opening. The degree of opening of the fuel adjusting valve 5 is fed back to the fuel adjusting valve control circuit 16 to act as a feedback signal 17. An adder 20 adds together a rated number of revolution bias from a bias setter 18a and a load signal from a load setter 18, and subtracts an actual number of revolutions of the gas turbine 8 detected by a revolution rate detector 19 from the resulting sum, and a difference signal thus calculated is applied to the speed/load control circuit 12. An adder 23 calculates a difference between an output signal from a temperature setter 21 generating a signal corresponding to the discharge pressure of compressor 3 and an output signal from a discharge gas temperature detector 22 for applying a difference signal to the temperature control circuit 13. Furthermore, an adder 26 calculates a difference among an output signal of another temperature setter 24 which sets the temperature of the exhaust gas of the gas turbine, the output signal from the discharge gas temperature detector 22 and a negative bias from another bias setter 25 which sets the negative bias for the purpose of preventing interference of the temperature control circuit for supplying difference signal to the inlet variable stationary blade control circuit 14, and the output thereof is sent to an inlet variable stationary blade position control circuit 27 for operating the inlet variable stationary blades 2. The position of these blades is fed back to the inlet variable stationary blade position control circuit 27 for positioning the blades.

With this control system, during starting of the gas turbine 8, the start control circuit 11 generates fuel control signals necessary to ignite and accelerate the gas turbine. However, since the rate of revolution of the gas turbine 8 is small and the temperature of the exhaust gas of the gas turbine is also low, the temperature control circuit 13 produces a fuel control signal of the maximum value. Consequently, the low value priority circuit 15 selects the signal from the start control circuit 11 so as to supply this signal to the fuel adjusting valve control circuit 16 for controlling the quantity of fuel.

When the revolution rate of the gas turbine increases near the rated number of revolutions per minute, the control is transferred from start control circuit 11 to speed/load control circuit 12. As the gas turbine and the generator 10 are brought into synchronism and connected to an electric power system, not shown, to share its load, the temperature of the exhaust gas of the gas turbine 8 increases. Then, the temperature control circuit 13 operates to limit the quantity of fuel.

The inlet variable stationary blades 2 are controlled by the inlet variable stationary blade position control circuit 27 to maintain the temperature of the exhaust gas temperature of the gas turbine 8 at a high value independently of the start control circuit 11, the speed/load control circuit 12 and the temperature control circuit 13.

FIG. 3 is a graph showing the relation between gas turbine output controlled by the gas turbine control system shown in FIG. 2 and the exhaust gas temperature. In FIG. 3, a dotted line A shows a temperature limit curve obtained by the temperature control circuit 13. The exhaust gas temperature varies along a thick solid line. The reason that this curve slopes downwardly toward the right lies in that the inlet temperature of the gas turbine is maintained at a constant value for preventing damage of the burner, and the first stage nozzles of the gas turbine caused by excessive temperature rise. Solid line B represents a temperature limit curve effected by the inlet variable stationary blade control circuit 14 and the difference between broken line A and solid line B corresponds to the magnitude of the bias signal provided by bias setter 25.

While the gas turbine is running under a partial load, since the inlet variable stationary blades are held at the minimum opening position, these blades are not influenced by the inlet variable stationary blade control circuit 14 so that an exhaust gas temperature characteristic as shown by a thick line section I-II can be obtained. As the output of the gas turbine 8 is increased, the quantity of air flowing into the gas turbine 8 is controlled by the inlet variable stationary blades 2 under control of the inlet variable stationary blade control circuit 14 so that the exhaust gas temperature would be maintained at a high value. As the output of the gas turbine is increased further, the exhaust gas temperature would be controlled as shown by sections II-III-IV. Meanwhile, the opening of the inlet variable stationary blades 2 is gradually increased with increase in the gas turbine output and these blades 2 are fully opened at position IV. As the gas turbine output is increased further, the exhaust gas temperature rises along a curve C showing a running characteristic of a gas turbine not equipped with the inlet variable stationary blades 2. As a consequence, when the exhaust gas temperature reaches a cross point V between broken line A and curve C, the temperature control circuit 13 operates to limit the quantity of fuel, thus reaching the maximum output.

As above described, with the prior art turbine control system shown in FIG. 2 and applicable to a gas turbine driven by a compressor having inlet variable stationary blades, as the load increases when the gas turbine exhaust temperature is increased by a fuel increase demand signal from the speed/load control circuit 12, the degree of opening of the inlet variable stationary blades 2 is increased to increase the air quantity so as to prevent the exhaust gas temperature from rising above a predetermined tempera-ture, thereby maintaining the exhaust gas temperature at a constant value. With this system, however, the temperature tends to exhibit a transient rise. Moreover, since the inlet variable stationary blades are operated after temperature rise, the load follow-up characteristic is poor. In other words, the response delay between sensing of the rise of the gas turbine exhaust temperature and opening of the inlet variable stationary blades causes a transient rise of the exhaust gas temperature as well as degradation of the load follow-up characteristic. Moreover, as the exhaust gas temperature is controlled by controlling the position of the inlet variable stationary blades, the quantity of air flowing into the gas turbine varies thus causing a difference between the load instruction signal from the speed/load control circuit 12 and the actual output signal of the gas turbine, which degrades the control characteristic.

SUMMARY OF THE INVENTION

Accordingly, it is an object of this invention to provide an improved gas turbine control system capable of causing the actual gas turbine output to accurately follow a gas turbine load instruction.

Another object of this invention is to provide a novel gas turbine control system capable of improving the load follow-up characteristic at the time of load variation and suppressing transient temperature rise.

According to this invention, there is provided a gas turbine control system comprising an electric power generating system including an air compressor having inlet variable stationary blades, a fuel burner supplied with compressed air from the compressor for burning fuel, a gas turbine driven by combustion gas from the fuel burner, a waste heat recovery boiler for generating steam by utilizing waste heat of gas exhausted from the gas turbine, a steam turbine driven by the steam, and an electric generator driven by the gas turbine; means for detecting an actual load of the gas turbine; first comparator means for comparing detected actual load with a load instruction for producing a difference signal; a speed/load control circuit responsive to difference between the difference signal and a signal representing a number of revolutions of the gas turbine for controlling a quantity of fuel supplied to the burner; second comparator means for comparing with each other the difference signal, a signal representing temperature of gas discharged from the gas turbine and a temperature set signal; and an inlet variable stationary blade control circuit inputted with an output of the second comparator means for controlling degree of opening of the inlet variable stationary blades.

DESCRIPTION OF THE PREFERRED EMBODIMENTS

Figure 1:
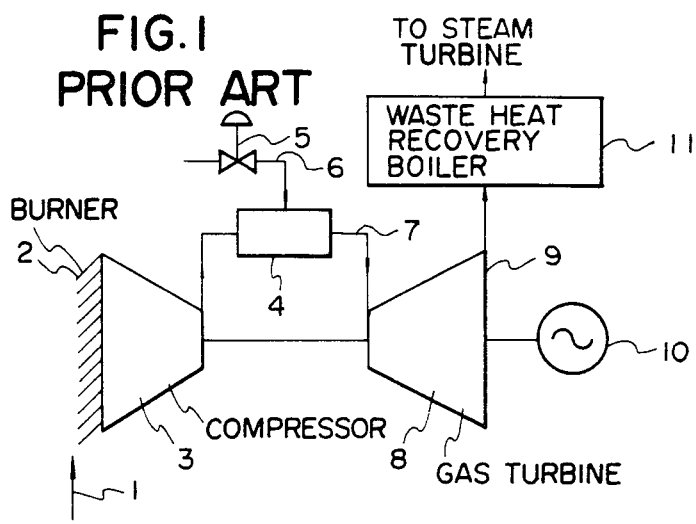
FIG. 1 is a block diagram showing a prior art gas turbine plant.
Figure 2:
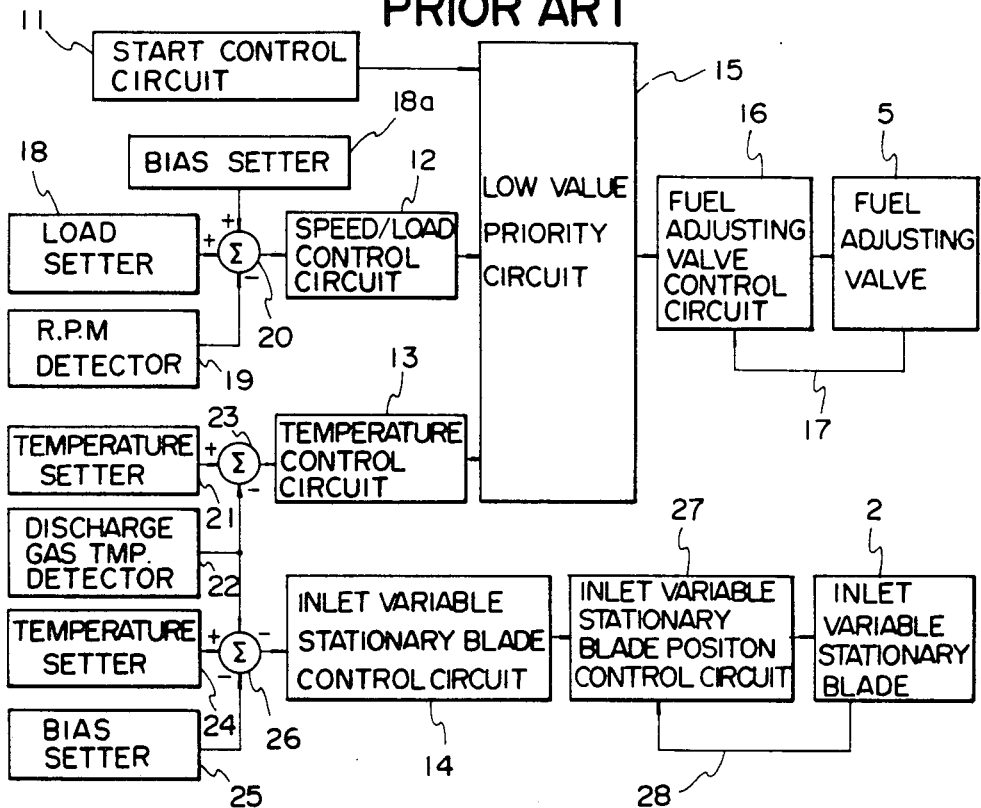
FIG. 2 is a block diagram showing a prior art gas turbine control system.
Figure 3:
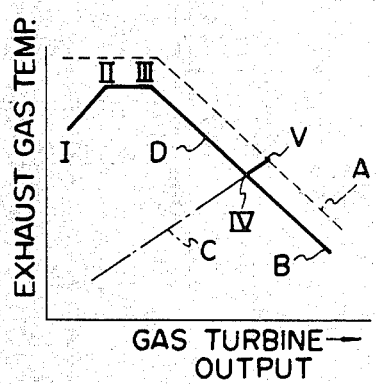
FIG. 3 is a graph showing the relation between the gas turbine output and the gas turbine exhaust gas temperature at the time of combined cycle running.

A preferred embodiment of this invention will now be described with reference to FIG. 4 which is different from FIG. 2 in the construction of the input sides of the speed/load control circuit 12 and the inlet variable stationary blade control circuit 14. More particularly, although the load setting for the gas turbine is done by the load setter 18, in the embodiment of this invention shown in FIG. 4, the output signal of a load setting instructor 31 is compared with an output signal from a gas turbine generator actual load detector 32 in an adder 33. Thus, a difference signal is supplied to the speed/load control circuit 12 via the load setter 18 whereby an increase signal for increasing the quantity of fuel is supplied to burner 4 (see FIG. 1). Further, the output signal of the adder 33 is supplied to an adder 26 of the inlet variable stationary blade control circuit 14 through a gain converter 34, in a direction to open the stationary blades 12 so that the quantity of air supplied to the gas turbine is increased. By executing the two controls described above, not only the transient temperature rise of the gas turbine can be effectively prevented, but also the load follow-up characteristic can be improved.

Figure 5:
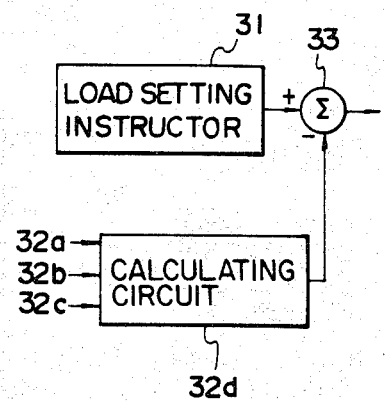
FIG. 5 is a block diagram showing another example of an actual load detector.
Figure 4:
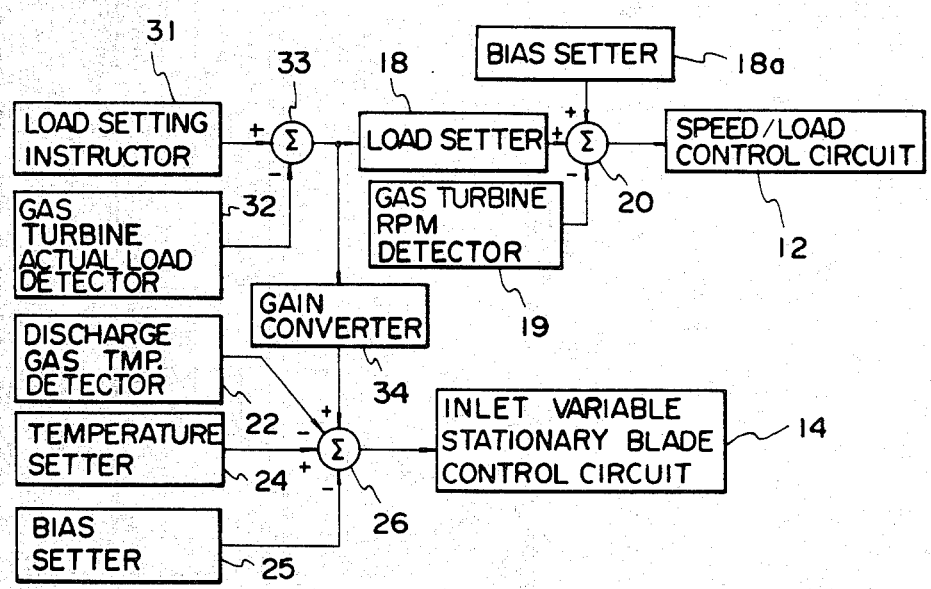
FIG. 4 is a block diagram showing one embodiment of the gas turbine control system according to this invention.

Although in the embodiment shown in FIG. 4 the output of the gas turbine generator is detected with the actual load detector 32, in the block diagram shown in FIG. 5, detected values of the degree of opening 32a of the inlet variable stationary blades 32a, the gas turbine exhaust temperature 32b and the compressor discharge pressure 32c are inputted to an output calculating circuit 32d to calculate a gas turbine output which is compared with the output of the load setting instructor 31 with adder 33.

Figure 6:
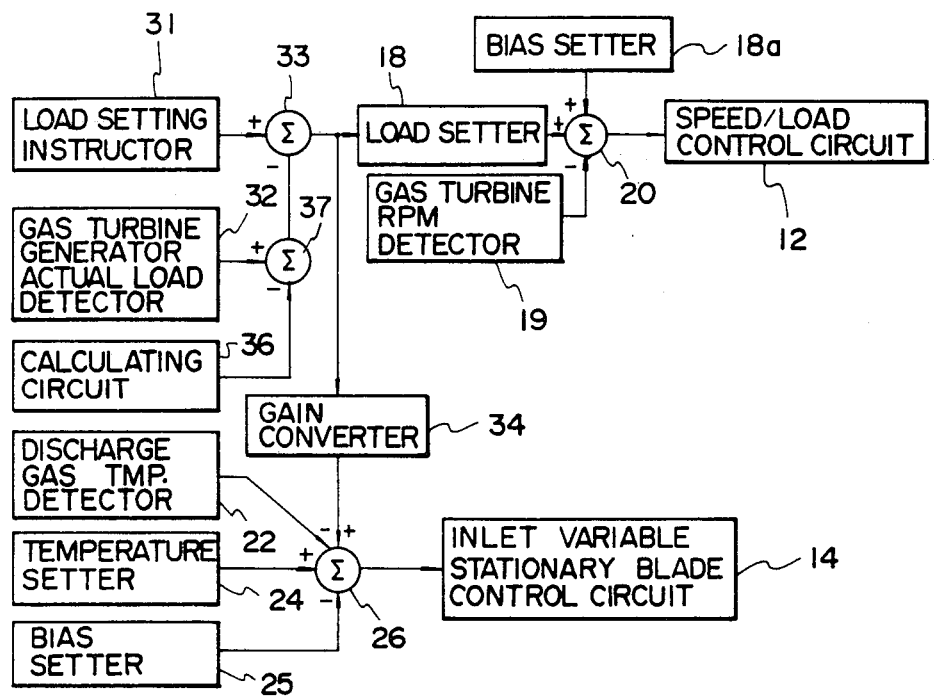
FIG. 6 is a block diagram showing a modification of the gas turbine control system of this invention.
Figure 7:
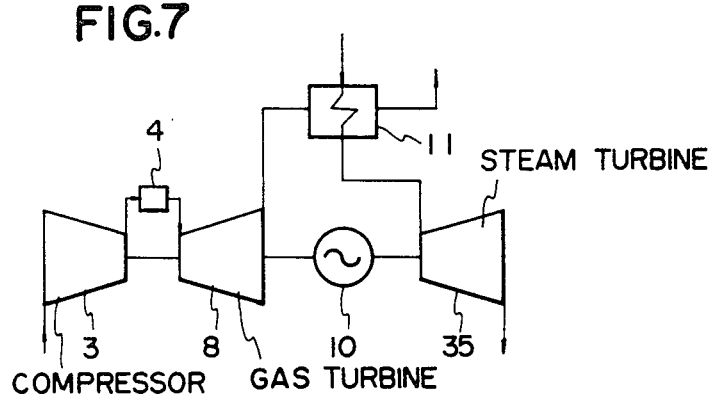
FIG. 7 is a block diagram showing the construction of a single shaft type combined cycle to which this invention is applicable.

FIG. 6 shows another embodiment of the gas turbine control system which is especially useful for a system shown in FIG. 7 comprising a compressor 3, a burner 4, a gas turbine 8, a waste heat recovery boiler 11, a steam turbine 35 and an electric generator 10 driven by gas turbine 8 and steam turbine 35.

In a combined cycle shown in FIG. 7, the output of generator 10, which is an actual load, corresponds to the sum of the outputs of the gas turbine 8 and the steam turbine 35. It is therefore impossible to detect the net output of the gas turbine 8. Although it is possible to correct the output signal of the generator by multiplying this output signal with a coefficient corresponding to an output share of the gas turbine 8 and the steam turbine 35, where the load is varied, since the follow-up characteristic of the waste heat recovery boiler 11 with reference to the gas turbine output is poor, the output of the steam turbine 35 does not vary at a predetermined ratio corresponding to the coefficient.

In the modification shown in FIG. 6 the principle that the output of the steam turbine 35 is proportional to the steam pressure of the first stage thereof is utilized. More particularly, a calculating circuit 36 is provided for calculating the steam turbine output by detecting the steam pressure of the first stage, and the output signal of the calculating circuit 36 is applied to an adder 37 to be subtracted from the output of a generator actual output detector 32, thereby obtaining a net gas turbine output. Other circuit elements are identical to those shown in FIG. 4.

With the modified embodiment shown in FIG. 6, the delay of the load follow-up of the steam turbine at the time of transient load variation can be compensated for on the side of the gas turbine. Further, this modification can prevent a overload condition of the gas turbine.

As above described, according to this invention, a highly reliable gas turbine control system is provided capable of causing the actual gas turbine output to precisely follow a load instruction of the gas turbine, thus improving the load follow-up characteristic at the time of load variation, and capable of suppressing transient temperature rise.

I claim:
1. A gas turbine control system comprising:
an electric power generating system including an air compressor having inlet variable stationary blades, a fuel burner supplied with compressed air from said compressor for burning fuel, a gas turbine driven by combustion gas from said fuel burner, a waste heat recovery boiler for generating steam by utilizing waste heat of gas exhausted from said gas turbine, a steam turbine driven by said steam, and an electric generator driven by said gas turbine;
means for detecting an actual load of said gas turbine and for producing an actual load signal indicative of said detected actual load;
a load setting instructor for producing a load demand signal;
first comparator means for determining a difference between said actual load signal and said load demand signal and for producing a first difference signal indicative of said determined difference;
means for detecting a speed of said gas turbine and for producing a speed signal indicative of said detected speed;
second comparator means for determining a second difference between said first difference signal and said speed signal and for producing a second difference signal indicative of said second difference;
a speed/load control circuit responsive to said second difference signal for controlling a quantity of fuel supplied to said burner;
a temperature detector for producing a signal representing a temperature of gas discharged from said gas turbine;
a temperature setter for setting the temperature of exhaust gas of said gas turbine and producing an output indicative of said set temperature;
third comparator means for comparing said output of said temperature setter, said first difference signal, and said signal produced by said temperature detector, and for producing an output indicative of the results of said comparison; and
an inlet variable stationary blade control circuit inputted with said output of said third comparator means for controlling a degree of opening of said input variable stationary blades.

2. The gas turbine control system according to claim 1 which further comprises a gain converter connected between an output of said first comparator means and an input of said third comparator means.

3. The gas turbine control system according to claim 1 wherein said speed/load control means utilizes a difference signal between total load of said electric power generating system and an output of said steam turbine as the actual load of said gas turbine.

4. The gas turbine control system according to claim 1 which further comprises a calculating circuit for calculating a gas turbine output signal based on inputted signals respectively representing a degree of opening of said inlet variable stationary blades, gas turbine exhaust temperature, and discharge pressure of said compressor, and means for applying said gas turbine output signal to said first comparator means.

5. The gas turbine control system according to claim 1 wherein said steam turbine is coupled to said electric generator to drive the same and said control system further comprises a generator actual output detector, a calculating circuit calculating an output of said steam turbine by detecting pressure of a first stage thereof, an adder inputted with outputs of said generator actual output detector and said calculating circuit, and means for applying an output of said adder to said comparator means.

* * * * *